(12) United States Patent
Hendricks et al.

(10) Patent No.: US 12,729,067 B2
(45) Date of Patent: Sep. 8, 2026

(54) METHOD AND SYSTEM FOR CONVEYING ARTICLES

(71) Applicant: Graphic Packaging International, LLC, Atlanta, GA (US)

(72) Inventors: Timothy W. Hendricks, Acworth, GA (US); Pete Karst, Canton, GA (US); Kevin T. May, Kennesaw, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 69 days.

(21) Appl. No.: 18/819,512

(22) Filed: Aug. 29, 2024

(65) Prior Publication Data

US 2025/0074709 A1 Mar. 6, 2025

Related U.S. Application Data

(60) Provisional application No. 63/535,726, filed on Aug. 31, 2023.

(51) Int. Cl.
*B65G 17/12* (2006.01)
*B65G 17/26* (2006.01)
(Continued)

(52) U.S. Cl.
CPC ............. *B65G 17/12* (2013.01); *B65G 17/26* (2013.01); *B65G 17/38* (2013.01); *B65G 47/84* (2013.01);
(Continued)

(58) Field of Classification Search
CPC .... B65G 47/22; B65G 21/2054; B65G 47/84; B65G 17/12; B65G 17/26; B65G 17/38
(Continued)

(56) References Cited

U.S. PATENT DOCUMENTS 2,791,315 A * 5/1957 Chapman ............. B65G 47/681 198/444
3,119,482 A * 1/1964 Ganz ...................... B65G 17/26 156/DIG. 27
(Continued)

FOREIGN PATENT DOCUMENTS

EP 0708028 B1 * 8/1998 ........... B65G 47/088
JP 2006-213475 A 8/2006
(Continued)

OTHER PUBLICATIONS

International Search Report and Written Opinion for PCT/US2024/044445 dated Dec. 13, 2024.

*Primary Examiner* — James R Bidwell
(74) *Attorney, Agent, or Firm* — Andrew N. Claerbout; FisherBroyles, LLP

(57) ABSTRACT

A method of conveying articles. The method can comprise moving a plurality of articles in a downstream direction on one or more conveyors, each article of the plurality of articles having an orientation. The method further can comprise moving a plurality of lugs in the machine direction along at least a portion of the one or more conveyors for guiding the articles as the articles are moved in the downstream direction. The plurality of lugs can be mounted along a guide apparatus for facilitating maintaining the orientations of the articles of the plurality of articles during a least a portion of the moving the plurality of articles in the downstream direction.

20 Claims, 6 Drawing Sheets

(51) Int. Cl.
*B65G 17/38* (2006.01)
*B65G 47/84* (2006.01)

(52) U.S. Cl.
CPC ................ *B65G 2201/0244* (2013.01); *B65G 2201/0252* (2013.01)

(58) Field of Classification Search
USPC .............................. 198/836.1, 454, 364, 413
See application file for complete search history.

(56) References Cited

U.S. PATENT DOCUMENTS

| | | | | |
|---|---|---|---|---|
| 5,282,525 | A * | 2/1994 | Covert | B65G 47/5113 198/454 |
| 2004/0050663 | A1 | 3/2004 | Ford et al. | |
| 2022/0204277 | A1 | 6/2022 | Zilzer | |
| 2022/0250855 | A1 * | 8/2022 | Elsperger | B65G 47/082 |

FOREIGN PATENT DOCUMENTS

| | | | | |
|---|---|---|---|---|
| JP | 2010-111457 | A | 5/2010 | |
| JP | 2011-241005 | A | 12/2011 | |
| WO | WO-2022146805 | A1 * | 7/2022 | B65G 21/2072 |

* cited by examiner

METHOD AND SYSTEM FOR CONVEYING ARTICLES

CROSS-REFERENCED TO RELATED APPLICATIONS

This application claims the benefit of U.S. Provisional Patent Application No. 63/535,726, filed on Aug. 31, 2023.

INCORPORATION BY REFERENCE

The disclosure of U.S. Provisional Patent Application No. 63/535,726, which was filed on Aug. 31, 2023, is hereby incorporated by reference for all purposes as if presented herein in its entirety.

BACKGROUND OF THE DISCLOSURE

The present disclosure generally relates to methods and systems for conveying containers, such as bottles and/or cans and/or other suitable articles. More specifically, the present disclosure is directed to methods and systems for conveying articles while maintaining an orientation for the respective articles, for example.

Articles may be moved on one or more conveyors in a packaging system, such as to move the articles to and/or through packaging equipment. For example, the articles may be loaded into partially formed cartons and/or wrap-style or clip-style carriers or other packaging materials may be applied to groups of the articles as they are moved through the packaging system. In some constructions, the articles may come into contact with a guide plate or wall or other suitable static feature (e.g., a static guide extending adjacent the conveyor and/or located between two conveyors). When one or more of the articles comes into contact with the static guide plate while the articles are moved on the conveyor (e.g., prior to being secured by a packaging material), friction between the static guide plate and the respective articles can cause the articles to rotate (e.g., about a vertical axis of the respective articles) or otherwise change the orientations of the articles. Such changes in orientation of the articles may be undesirable in situations wherein the articles are intended to be delivered to the packaging equipment with a predetermined orientation (e.g., so that UPC labels or other aspects of the respective articles are hidden by the packaging materials in the final package and/or so that logos or other aspects of the articles are visible in the final package). Accordingly, there is a need for a method and system for conveying articles while maintaining an orientation of the respective articles.

SUMMARY OF THE DISCLOSURE

In general, one aspect of the disclosure is directed to a method of conveying articles. The method can comprise moving a plurality of articles in a downstream direction on one or more conveyors, each article of the plurality of articles having an orientation. The method further can comprise moving a plurality of lugs in the machine direction along at least a portion of the one or more conveyors for guiding the articles as the articles are moved in the downstream direction. The plurality of lugs can be mounted along a guide apparatus for facilitating maintaining the orientations of the articles of the plurality of articles during a least a portion of the moving the plurality of articles in the downstream direction.

In another aspect, the disclosure is generally directed to a system for conveying articles. The system can comprise one or more conveyors moving a plurality of articles in a downstream direction, each article of the plurality of articles having an orientation. The system further can comprise a guide apparatus guiding the articles as the articles are moved in the downstream direction. The guide apparatus can comprise a plurality of lugs extending along at least a portion of the one or more conveyors. The guide apparatus can move the lugs in the downstream direction along the plurality of articles for facilitating maintaining the orientations of the articles of the plurality of articles while articles are moved in the downstream direction.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to a system and method of conveying containers and/or other articles in a system and method for forming packages that can include carriers, cartons, and/or other suitable packaging materials holding the containers and/or other articles. The containers can be used for packaging food and beverage products, for example. The containers can be made from materials suitable in composition for packaging the particular food or beverage item, and the materials can include, but are not limited to, glass; plastics such as PET, LDPE, LLDPE, HDPE, PP, PS, PVC, EVOH, and Nylon; and the like; aluminum and/or other metals; or any combination thereof. The system and method according to the present disclosure can accommodate containers of numerous different shapes. For the purpose of illustration and not for the purpose of limiting the scope of the disclosure, the following detailed description describes beverage containers (e.g., aluminum cans, glass bottles, etc.) engaged by the system embodiments. In this specification, the terms “lower,” “bottom,” “upper,” and “top” indicate orientations determined in relation to upright containers.

Figure 1:
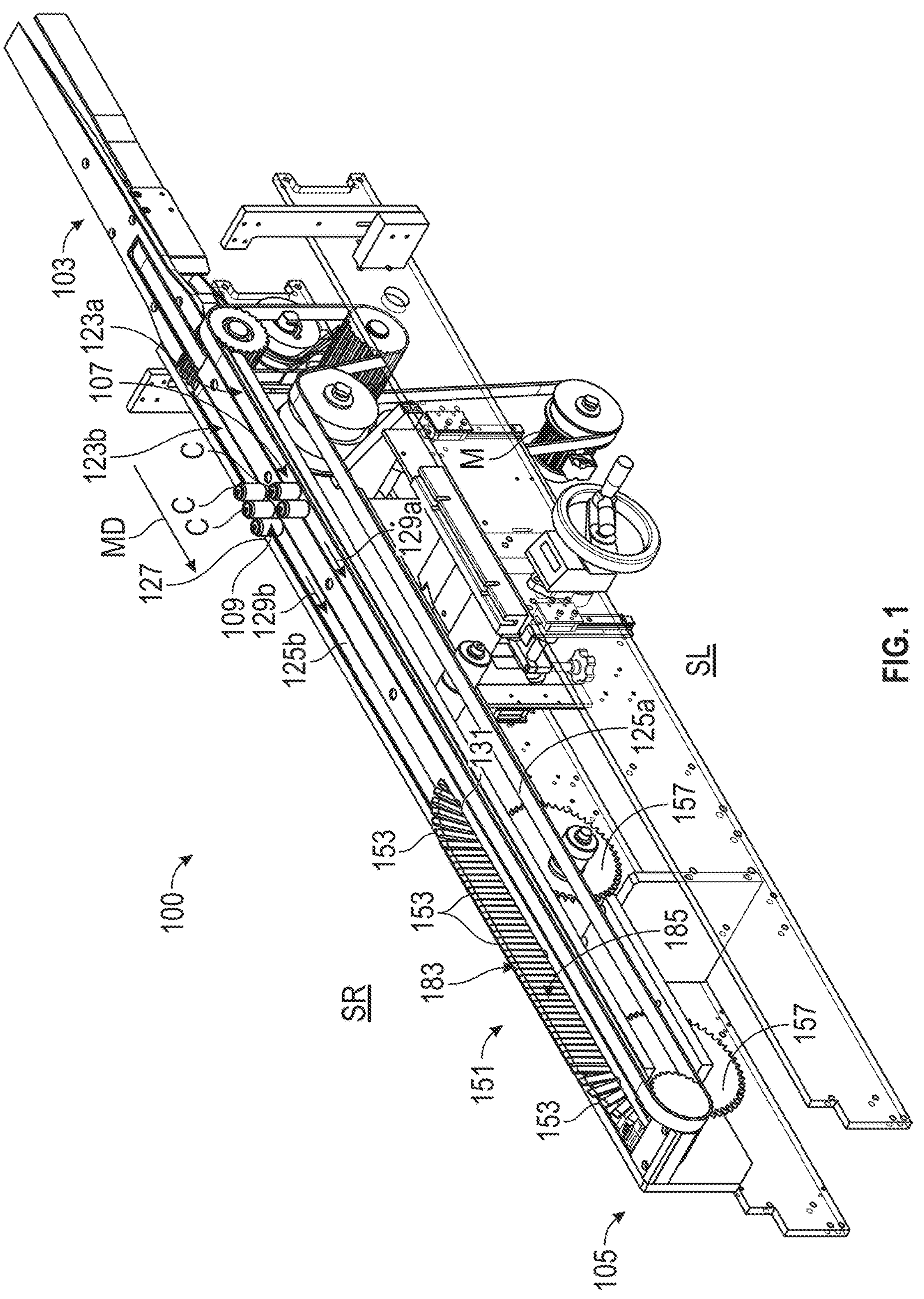
FIG. 1 is a perspective view of a system for conveying articles according to exemplary embodiments of the disclosure.

FIG. 1 illustrates an example embodiment of a system and method 100 for conveying articles (e.g., the containers C or other suitable articles) in a packaging system and method for forming packages (not shown) in accordance with the disclosure. In embodiments, the conveyor system 100 can transport articles as part of a larger packaging system (e.g., that attaches constructs to containers, wraps constructs around containers, loads containers into cartons, etc.). In the illustrated embodiments, the conveyor system 100 can move the articles downstream in a machine direction MD from an upstream end 103 (e.g., at an infeed portion of the packaging system) to a downstream end 105. In embodiments, the conveyor system 100 can move the articles at least partially through a packaging apparatus that can apply packaging materials (e.g., cartons, clips, wraps, etc.) to groups of the articles to form the packages. As shown in FIG. 1, the articles can be a plurality of containers C in the form of beverage cans arranged in a first series or row 107 and a second series or row 109 in relation to the system 100.

Figure 2B:
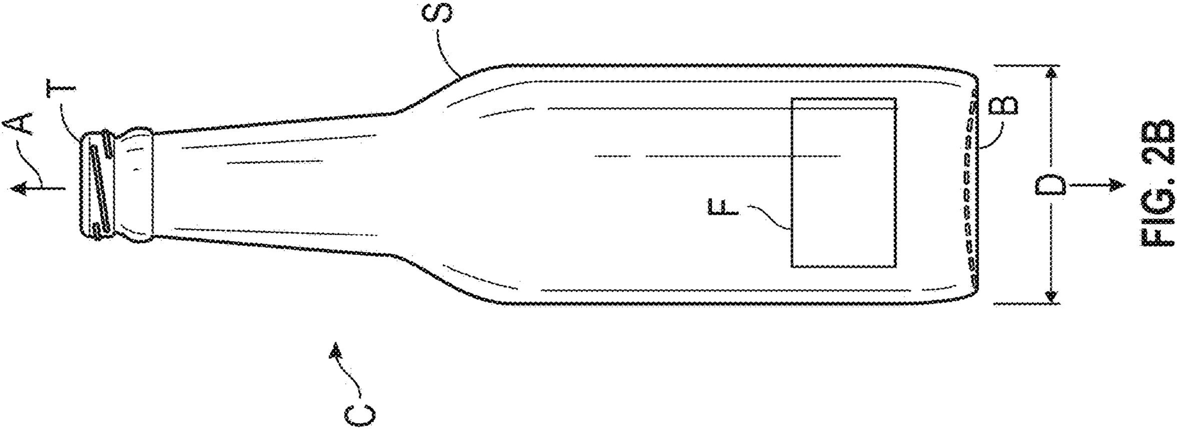
FIGS. 2A and 2B are schematic views of exemplary articles that may be conveyed with the system of FIG. 1 according to exemplary embodiments of the disclosure.
Figure 2A:
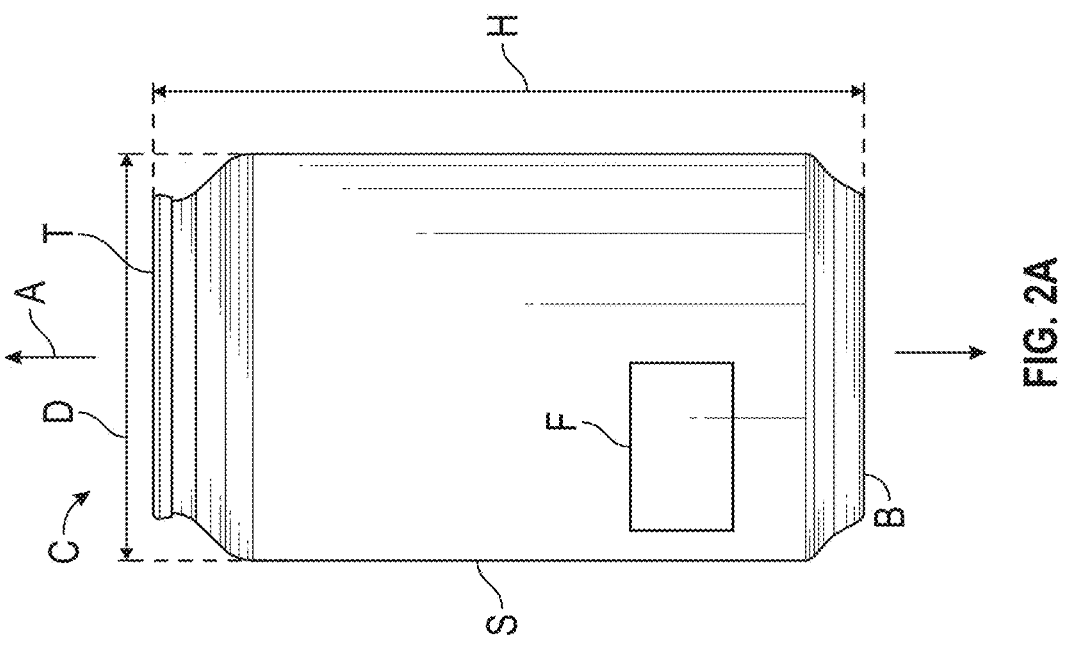

As shown in FIGS. 2A and 2B, the containers C could be in the form of a beverage can (FIG. 2A), a beverage bottle (FIG. 2B), and/or any suitable container or other article. In the illustrated embodiments, each of the containers C (FIGS. 2A and 2B) can have a vertical axis A and can have an orientation relative to the vertical axis A. For example, each container C can have a feature F (e.g., a UPC label, a logo, and/or other suitable aspect of the container), and the container can be oriented with the feature F positioned about the vertical axis A of the respective container C so that the feature F is located in the resulting package (not shown) according to a predetermined orientation. For example, the containers C may be oriented in the packaging system so that the UPC labels of the individual containers are hidden by the other containers and/or the packaging materials of the final package, which can help avoid accidental scanning of the UPC label of an individual container rather than the UPC label of the final package (e.g., which may be located on the packaging materials). In other examples, the feature F could be a logo or other feature, wherein the containers C are oriented about their axes so that the feature F is visible via an opening or window of the final package. As shown in FIGS. 2A and 2B, the containers C can have a diameter D (e.g., a characteristic or outermost diameter) and can have a sidewall S extending between a top T and a bottom B along a height H of the container C. The containers C could be otherwise arranged, shaped, positioned, and/or configured without departing from the disclosure.

Figures 3, 4:
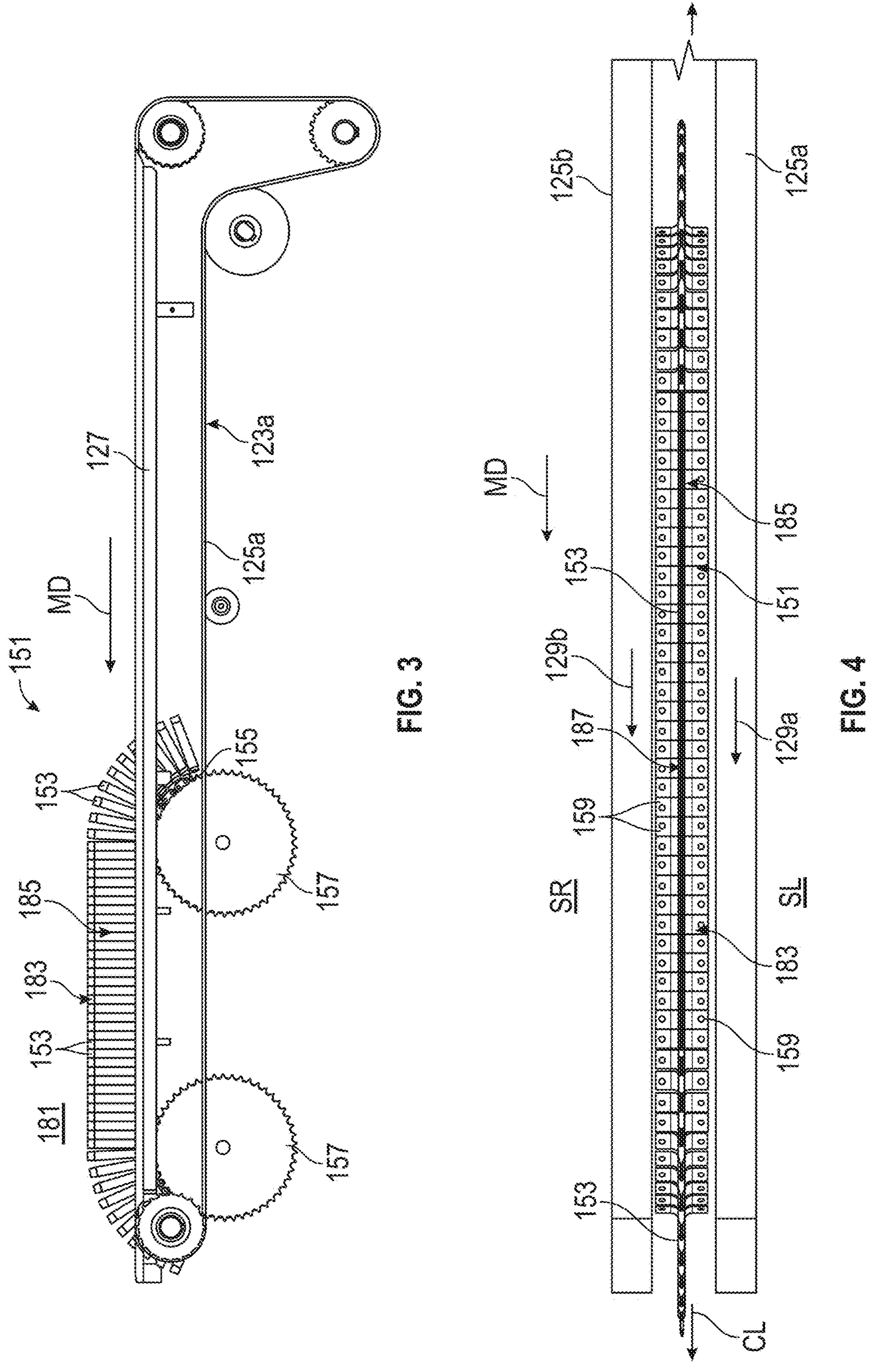
FIG. 3 is a side view of the system of FIG. 1.
FIG. 4 is a top view of a guide apparatus and the conveyors of the system of FIGS. 1 and 3.

In the illustrated embodiments, the system 100 can have a first or left side SL and a second or right side SR, which are determined while looking in the downstream direction MD. In embodiments, the system 100 of the present disclosure can receive articles from one or more orientation units (not shown) and/or other suitable infeed features onto two conveyors 123*a*, 123*b* (e.g., with the respective streams 107, 109 of containers C on the respective conveyors 123*a*, 123*b*). As shown in FIGS. 1 and 4, the conveyors 123*a*, 123*b* can be located on the respective left side SL and right side SR of the conveyor system 100 (e.g., on either side of the centerline CL of the system 100 extending in the machine direction MD). In other embodiments, the system could include any suitable number of conveyors 123*a*, 123*b* (e.g., one or more conveyors).

In embodiments, the conveyors 123*a*, 123*b* can receive the articles from one or more orientation units (not shown) that can use cameras and/or other sensors to determine the orientation of graphics, labels, and/or other features F on the respective articles and can use motors or other suitable apparatus to selectively rotate the individual articles (e.g., about the vertical axis A of the respective articles) to move the desired features to a predetermined orientation as the orientation units move the articles along a path of travel (e.g., about a central axis of the orientation unit). In the illustrated embodiment, the orientation units can output the articles in the predetermined orientation onto the respective conveyors 123*a*, 123*b* in the respective rows 107, 109. Accordingly, the orientation units can orient each article on its axis to ensure that features F (e.g., universal product codes or other information) of the containers C are inward-facing and are hidden by the other articles and/or packaging materials in a package formed with the containers and/or to ensure that features F (e.g., a label, a logo, or other information) of the articles are facing outwardly in the resulting package, for example. Alternatively, the orientation assemblies could be omitted, and the articles can be received by the system 100 via a conveyor or any suitable apparatus.

In the illustrated embodiments, each of the conveyors 123*a*, 123*b* can comprise a respective conveyor belt 125*a*, 125*b* (e.g., an endless belt) supported along a respective path of travel 129*a*, 129*b* by a support plate 127. As shown in FIGS. 1 and 3, each of the belts 125*a*, 125*b* can engage a plurality of wheels or rollers that can support and/or guide the belts and/or can apply tension to the belts. One or more of the wheels can be driven by a motor (M) or other suitable drive mechanism for moving the belts 125*a*, 125*b* so that the portions of the belts 125*a*, 125*b* extending along the respective paths of travel 129*a*, 129*b* move in the machine direction MD. Accordingly, the belts 125*a*, 125*b* can carry/move the articles in the machine direction MD in the two streams or lines 107, 109 (e.g., one series of articles 107, 109 carried on each of the belts 125*a*, 125*b*). The conveyors 125*a*, 125*b* could be otherwise arranged, shaped, positioned, and/or configured without departing from the disclosure. For example, the conveyors could be any suitable conveying apparatus. In embodiments, the system 100 could include any suitable number (e.g., one or more) of conveyors.

As shown in FIGS. 1 and 3-5, the system 100 can include a guide apparatus 151 located between the conveyors 123*a*, 123*b* along at least a portion of the paths of travel 129*a*, 129*b*. In embodiments, any suitable number of guide apparatuses 151 could be included along one or more of the conveyors 123*a*, 123*b*. In the illustrated embodiments, the guide apparatus 151 can include a plurality of lugs 153 (FIGS. 6A and 6B) mounted on a chain 155 (e.g., an endless chain) (FIG. 7B) or other suitable support. As shown in FIG. 1, the guide apparatus 151 can be aligned with a cutout 131 extending in the support plate 127 between the conveyors 123*a*, 123*b* so that the lugs 153 can move up through the cutout 131, along a top of the guide apparatus 151, and down through the cutout 131 at the downstream end of the guide apparatus 151.

Figure 5:
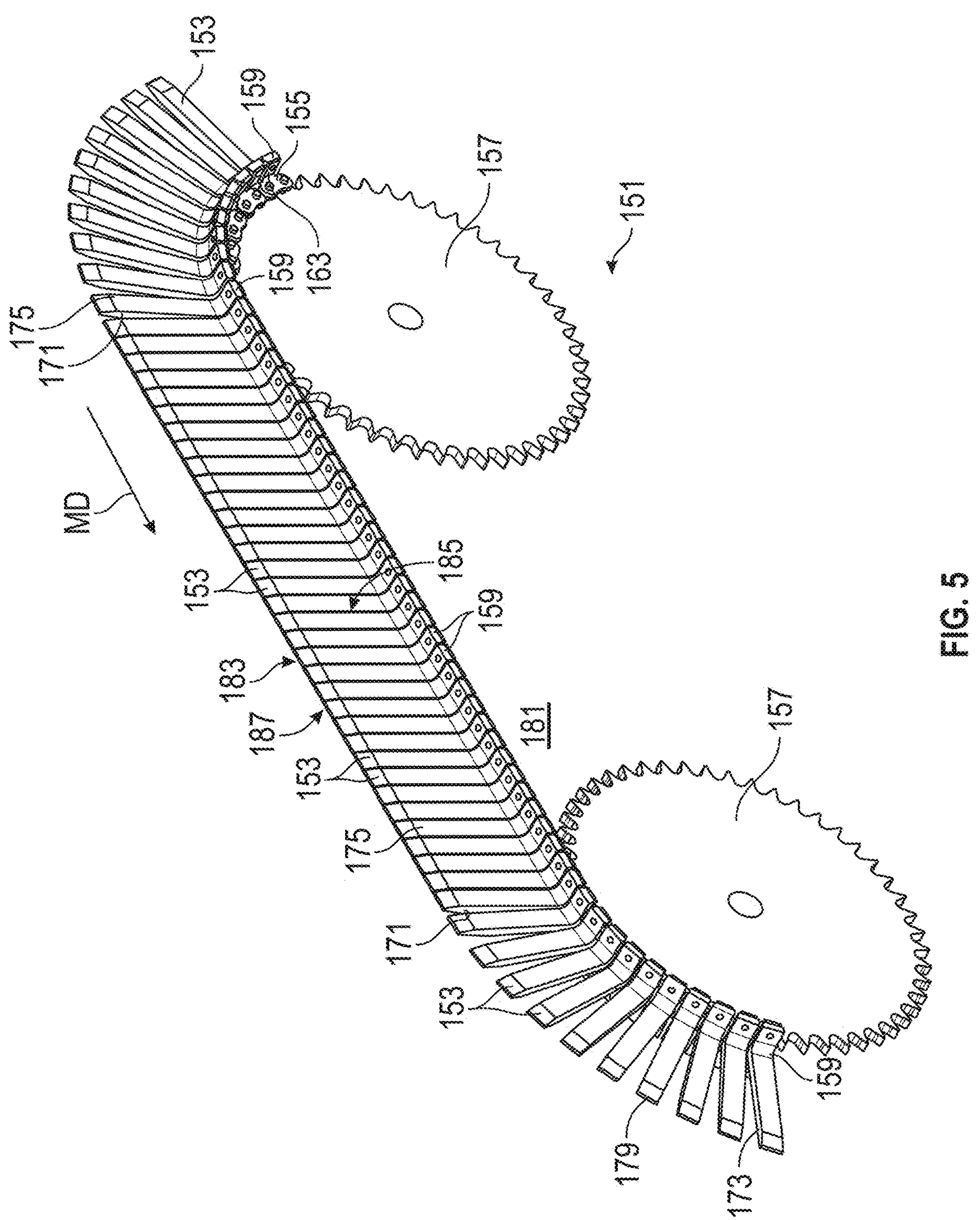
FIG. 5 is a perspective view of the guide apparatus of FIGS. 1, 3, and 4.

As shown in FIGS. 1, 3, and 5, the chain 155 can be supported on two wheels 157 or any suitable number of wheels. While only a portion of the chain 155 and the lugs 153 is shown in the figures, the chain 155 can extend entirely around the wheels 157 and between the wheels 157 along the top and bottom of the guide apparatus, and the lugs 153 can be mounted along the entire length of the chain 155. In embodiments, one or both of the wheels 157 can be driven (e.g., by the same drive mechanism that moves the belts 125*a*, 125*b* of the conveyors 123*a*, 123*b* and/or another suitable motor or drive mechanism) so that the lugs 153 are moved in the machine direction MD between the paths of travel 129*a*, 129*b* of the belts 125*a*, 125*b*. For example, one or both of the wheels 157 can be driven by one or more drive belts and/or gearing (not shown) in communication with the motor M so that the chain 155 is driven at a common speed or a similar speed as the conveyor belts 125*a*, 125*b*.

Figure 6A:
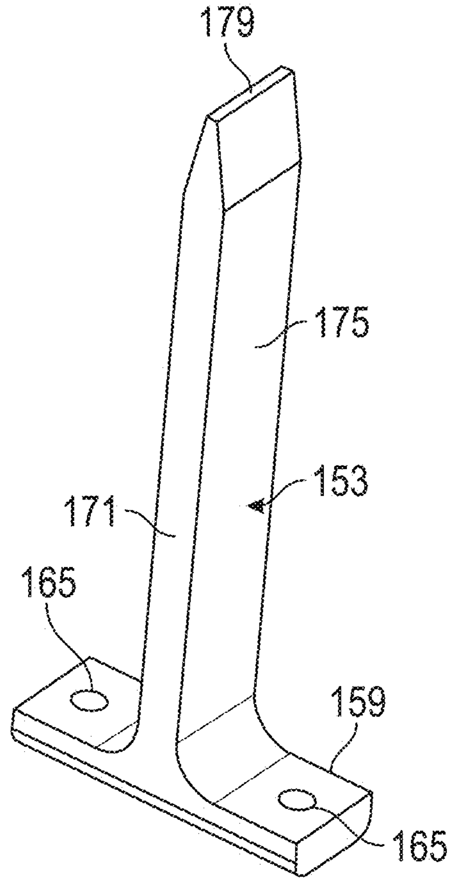
FIGS. 6A and 6B are perspective views of individual lugs of the guide apparatus of FIG. 5.
Figure 6B:
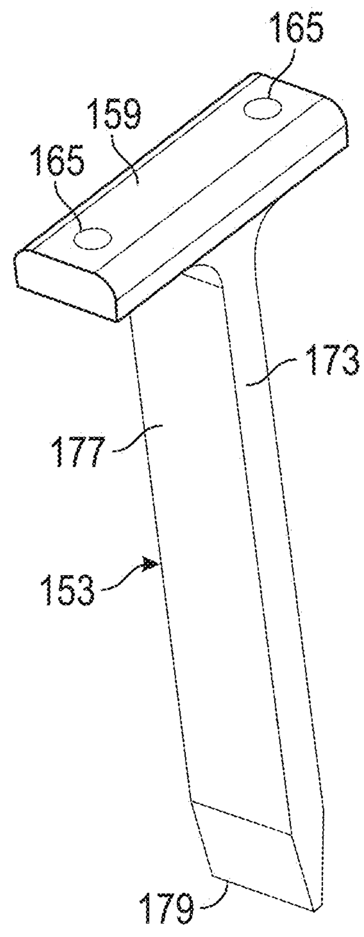
Figures 7A, 7B:
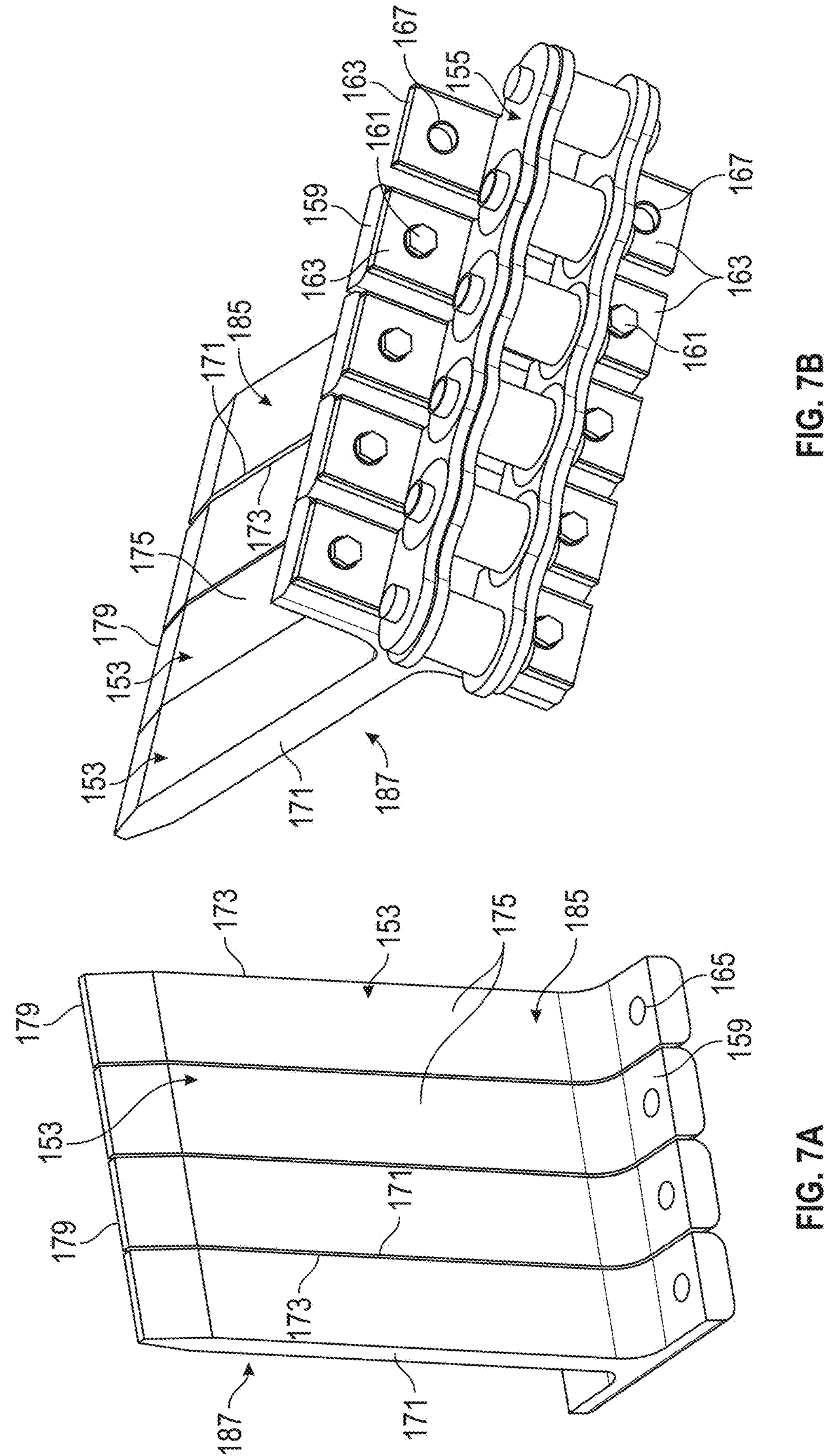
FIGS. 7A and 7B are perspective views of a grouping of the lugs of FIGS. 6A and 6B.

As shown in FIGS. 6A and 6B, each of the lugs 153 can have a base or flange 159 that is mounted to the chain 155 (e.g., via fasteners 161). For example, as shown in FIG. 7B, the chain 155 can include a plurality of attachment plates 163, which can be welded and/or otherwise affixed to respective chain links of the chain 155 so that the attachment plates 163 extend horizontally and outwardly from the remainder of the chain 155. In the illustrated embodiments, a bottom surface of the flange 159 of each lug 153 can be positioned in face-to-face contact with a top surface of two of the attachment plates 163. In embodiments, two flange holes 165 in each of the flanges 159 (FIGS. 6A-7A) can be aligned with respective attachment holes 167 in the respective attachment plates 163 (FIG. 7B) so that the fasteners 161 can be received in the holes 165, 167 to affix the flanges 159 to the attachment plates 163 (FIG. 7B).

As shown in FIGS. 6A and 6B, each of the lugs 153 can have a leading or downstream end face 171, a trailing or upstream end face 173, a first or left side face 175, and a second or right side face 177. In the illustrated embodiments, the faces 171, 173, 175, 177 can extend away from the flange 159 to a tapered top end 179. When the lugs 153 are moving along the top 181 of the guide apparatus 151 where the chain 155 is moving the lugs 153 in the downstream direction MD (FIG. 5), the faces 171, 173, 175, 177 of the lugs 153 can extend upwardly from the flange 159 with the leading end face 171 facing the downstream end 105 of the system 100 and the trailing end face 173 facing the upstream end 103 of the system 100. In embodiments, the lugs 153 can be mounted to the chain 155 so that adjacent lugs 153 are in close proximity or are abutting one another as the lugs 153 are moved between the paths of travel 129*a*, 129*b* along the top 181 of the guide apparatus 151. For example, the lugs 153 moving along the top 181 of the guide apparatus 151 can be arranged with the leading face 171 of each lug 151 in opposing relationship with the trailing end face 173 of an adjacent downstream lug 153 until the lugs 153 move to the downstream end of the guide apparatus 151 and begin to move downwardly over the downstream wheel 157 (FIGS. 3-5). The lugs 153 could be otherwise arranged, shaped, positioned, and/or configured without departing from the disclosure.

In exemplary embodiments, a plurality of the lugs 153 that are extending along the top 181 of the guide apparatus 151 can cooperate to at least partially form a guide wall 183 (e.g., a moving guide wall) extending between the conveyors 123*a*, 123*b*. For example, the first side faces 175 of the lugs 153 can cooperate to form a left or first wall face 185 of the guide wall 183, and the second side faces 177 of the lugs 153 can cooperate to form a right or second wall face 187 of the guide wall 183. As shown in FIGS. 1 and 3-5, the first wall face 185 extends along and faces the conveyor belt 125*a* on the left side SL of the system 100 and the second wall face 187 extends along and faces the conveyor belt 125*b* on the right side SR of the system 100 so that the wall faces 185, 187 can guide the containers C on the respective conveyor belts 125*a*, 125*b*. In embodiments, a grouping or set of the lugs 153 is shown in FIGS. 7A and 7B as it would be while moving along the top 181 of the guide apparatus 151, forming a portion of the guide wall 183. As shown in FIGS. 7A and 7B, the grouping of lugs 153 (e.g., lugs 153 extending along the top 181 of the guide apparatus 151 to form a portion of the guide wall 183) can be arranged so that the leading end face 171 of each lug 153 and the trailing end face 173 of a respectively adjacent lug 153 are in an opposing, facing relationship. In embodiments, the opposing faces 171, 173 of adjacent lugs 153 while forming a portion of the guide wall 183 can be in close proximity and/or can be at least partially in contact with one another.

The guide apparatus 151 could be otherwise arranged, shaped, positioned, and/or configured without departing from the disclosure.

In operation, the articles are moved on the belts 125*a*, 125*b* of the conveyors 123*a*, 123*b* along the paths of travel 129*a*, 129*b* in the machine direction MD. For example, the containers C can be received from one or more orientation units (not shown) in two series or rows 107, 109 on the respective belts 125*a*, 125*b*, which can move the containers C along the respective paths of travel 129*a*, 129*b* toward the guide apparatus 151. As shown in FIG. 1, the support plate 127 can support the belts 125*a*, 125*b* and the containers C on the belts as the containers C are carried on the belts 125*a*, 125 along the paths of travel 129*a*, 129*b*. Further, the lugs 153 are moved along the guide apparatus 151 in the machine direction MD between the paths of travel 129*a*, 129*b* at the same rate or at a similar rate as the articles are moved by the conveyors 123*a*, 123*b*. Any article that comes into contact with one or more of the lugs 153 as the articles and the lugs 153 are moved in the machine direction MD will be guided by the one or more lugs 153 (e.g., prevented from moving out of its path of travel 129*a*, 129*b* and/or moving against another article in the other path of travel 129*a*, 129*b*). In embodiments, the lack of relative movement between the lugs 153 and the articles (e.g., since they are moved at a similar or the same rate in the same direction) can help reduce or eliminate any tendency of the articles to rotate or otherwise change orientation as they are moved along the paths of travel 129*a*, 129*b*. In contrast, friction between a stationary guide plate and the articles as the articles are moved past such a static guide plate can cause the articles to rotate so that they are no longer oriented according to the predetermined orientation (e.g., as set by an upstream orientation unit).

In the illustrated embodiments, the lugs 153 can be moved on the chain 155 upwardly on the upstream wheel 157, through the cutout 131 in the support plate 127, until the respective lugs 153 extend vertically from the chain 155 at the top 181 of the guide apparatus 151. In exemplary embodiments, the lugs 153 can join the guide wall 183, one after another, as the chain 155 moves upwardly along the upstream wheel 157 to the top 181 of the guide apparatus 151. The lugs 153 can move along the top 181 of the guide apparatus 151 as part of the guide wall 183 until the chain 155 moves the respective lugs 153, in sequence, downwardly over the downstream wheel 157, the lugs 153 separating from the guide wall 183 at the downstream wheel 157, one after another. the lugs 153 can be returned to the upstream wheel 157 as the chain 155 moves along the bottom of the guide apparatus 151. In embodiments, as a result of the movement of the individual lugs 153 through the guide apparatus 151, the guide apparatus 151 forms the guide wall 183 moving continuously between the paths of travel 129*a*, 129*b* with the rows 107, 109 of the containers C. The guide apparatus 151 and/or the system 100 could be otherwise operated without departing from the scope of the disclosure.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of conveying articles, the method comprising:

moving a plurality of articles in a downstream direction on one or more conveyors, each article of the plurality of articles having an orientation; and moving a plurality of lugs in a machine direction along at least a portion of the one or more conveyors for guiding the articles as the articles are moved in the downstream direction, the plurality of lugs being mounted along a guide apparatus for facilitating maintaining the orientations of the articles of the plurality of articles during a least a portion of the moving the plurality of articles in the downstream direction, each lug of the plurality of lugs comprises a side face extending between a leading end face and a trailing end face, and wherein the leading end face of each of the lugs in a set of lugs of the plurality of lugs is in an opposing relationship with the trailing end face of an adjacent one of the lugs of the plurality of lugs during the moving the plurality of lugs in the downstream direction.

2. The method of claim 1, wherein the moving the plurality of articles and the moving the plurality of lugs comprises moving the lugs and the articles at a common speed in the downstream direction.

3. The method of claim 1, wherein the one or more conveyors comprise a conveyor belt moving in the downstream direction and the moving the plurality of articles in the downstream direction comprises moving a series of articles of the plurality of articles on the conveyor belt, and wherein at least a portion of the guide apparatus is positioned proximate the conveyor belt.

4. The method of claim 3, wherein the conveyor belt and the lugs are moved at a common speed in the downstream direction.

5. The method of claim 1, wherein the one or more conveyors comprise at least a first conveyor belt extending on a first side of the guide apparatus and a second conveyor belt extending on a second side of the guide apparatus, and the moving the plurality of articles in the downstream direction comprises moving a first series of articles of the plurality of articles on the first conveyor belt and moving a second series of articles of the plurality of articles on the second conveyor belt.

6. The method of claim 5, wherein the side face is a first side face and each lug of the plurality of lugs comprises a second side face, and wherein the first side faces of the lugs cooperate to at least partially form a first wall face facing the first conveyor belt during the moving the plurality of lugs in the downstream direction and the second side faces of the lugs cooperate to at least partially form a second wall face facing the second conveyor belt during the moving the plurality of lugs in the downstream direction.

7. The method of claim 1, wherein the side faces of the lugs of the set of lugs cooperate to at least partially form a wall face of a moving wall, the wall face facing the one or more conveyors during the moving the plurality of lugs in the downstream direction.

8. The method of claim 1, wherein the guide apparatus comprises a chain supported on one or more wheels, wherein the method further comprises operating the guide apparatus to move the chain over the wheels so that the chain moves in the downstream direction along a top of the guide apparatus, and wherein the lugs are respectively mounted to the chain.

9. The method of claim 8, wherein each lug of the plurality of lugs comprises a flange that is fastened to a respective attachment extending from the chain.

10. A system for conveying articles, the system comprising:

one or more conveyors moving a plurality of articles in a downstream direction, each article of the plurality of articles having an orientation; and a guide apparatus guiding the articles as the articles are moved in the downstream direction, the guide apparatus comprising a plurality of lugs extending along at least a portion of the one or more conveyors, wherein the guide apparatus moves the lugs in the downstream direction along the plurality of articles for facilitating maintaining the orientations of the articles of the plurality of articles while articles are moved in the downstream direction, each lug of the plurality of lugs comprises a side face extending between a leading end face and a trailing end face, and wherein the leading end face of each of the lugs in a set of lugs of the plurality of lugs is in an opposing relationship with the trailing end face of an adjacent one of the lugs of the plurality of lugs while the lugs move along a top of the conveyor.

11. The system of claim 10, wherein the guide apparatus and the one or more conveyors are configured to move the lugs and the articles at a common speed in the downstream direction.

12. The system of claim 10, wherein the one or more conveyors comprise a conveyor belt moving in the downstream direction and a series of articles of the plurality of articles is positioned on the conveyor belt, and wherein at least a portion of the guide apparatus is positioned proximate the conveyor belt.

13. The system of claim 12, wherein the conveyor belt and the lugs are configured to be moved at a common speed in the downstream direction.

14. The system of claim 10, wherein the one or more conveyors comprise at least a first conveyor belt extending on a first side of the guide apparatus and a second conveyor belt extending on a second side of the guide apparatus, and wherein a first series of articles of the plurality of articles is positioned on the first conveyor belt, and a second series of articles of the plurality of articles is positioned on the second conveyor belt.

15. The system of claim 14, wherein the side face is a first side face and each lug of the plurality of lugs comprises a second side face, and wherein the first side faces of the lugs extending on a top of the guide apparatus cooperate to at least partially form a first wall face facing the first conveyor belt and the second side faces of the lugs extending on the top of the guide apparatus cooperate to at least partially form a second wall face facing the second conveyor belt.

16. The system of claim 10, wherein the side faces of the lugs of the set of lugs cooperate to at least partially form a wall face of a moving wall, the wall face facing the one or more conveyors.

17. The system of claim 10, wherein the guide apparatus comprises a chain supported on one or more wheels, wherein the guide apparatus moves the chain over the wheels so that the chain moves in the downstream direction along a top of the guide apparatus, and wherein the lugs are respectively mounted to the chain.

18. The system of claim 17, wherein each lug of the plurality of lugs comprises a flange that is fastened to a respective attachment extending from the chain.

19. A method of conveying articles, the method comprising:

moving a plurality of articles in a downstream direction on one or more conveyors, each article of the plurality of articles having an orientation; and moving a plurality of lugs in a machine direction along at least a portion of the one or more conveyors for guiding the articles as the articles are moved in the downstream direction, the plurality of lugs being mounted along a guide apparatus for facilitating maintaining the orientations of the articles of the plurality of articles during a least a portion of the moving the plurality of articles in the downstream direction, the one or more conveyors comprise at least a first conveyor belt extending on a first side of the guide apparatus and a second conveyor belt extending on a second side of the guide apparatus, and the moving the plurality of articles in the downstream direction comprises moving a first series of articles of the plurality of articles on the first conveyor belt and moving a second series of articles of the plurality of articles on the second conveyor belt.

20. A system for conveying articles, the system comprising:

one or more conveyors moving a plurality of articles in a downstream direction, each article of the plurality of articles having an orientation; and a guide apparatus guiding the articles as the articles are moved in the downstream direction, the guide apparatus comprising a plurality of lugs extending along at least a portion of the one or more conveyors, wherein the guide apparatus moves the lugs in the downstream direction along the plurality of articles for facilitating maintaining the orientations of the articles of the plurality of articles while articles are moved in the downstream direction, the one or more conveyors comprise at least a first conveyor belt extending on a first side of the guide apparatus and a second conveyor belt extending on a second side of the guide apparatus, and wherein a first series of articles of the plurality of articles is positioned on the first conveyor belt, and a second series of articles of the plurality of articles is positioned on the second conveyor belt.

* * * * *